(12) United States Patent
Menez et al.

(10) Patent No.: US 8,001,300 B2
(45) Date of Patent: Aug. 16, 2011

(54) METHOD AND APPARATUS FOR SPECIFYING ANALOG CONNECTIONS FOR DATA BUS NETWORK DEVICES HAVING BOTH DIGITAL AND ANALOG OUTPUTS

(75) Inventors: Benoit Pol Menez, Indianapolis, IN (US); Mark Gilmore Mears, Zionsville, IN (US); Chad Andrew Lefevre, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 658 days.

(21) Appl. No.: 10/512,358

(22) PCT Filed: Apr. 22, 2003

(86) PCT No.: PCT/US03/12571
§ 371 (c)(1),
(2), (4) Date: Oct. 25, 2004

(87) PCT Pub. No.: WO03/092279
PCT Pub. Date: Nov. 6, 2003

(65) Prior Publication Data
US 2005/0174254 A1 Aug. 11, 2005

Related U.S. Application Data

(60) Provisional application No. 60/375,136, filed on Apr. 24, 2002, provisional application No. 60/375,207, filed on Apr. 24, 2002.

(51) Int. Cl.
*G06F 13/12* (2006.01)
*G06F 13/38* (2006.01)
*G06F 3/00* (2006.01)

(52) U.S. Cl. ............... 710/62; 710/15; 710/16; 710/17; 710/18; 710/19

(58) Field of Classification Search ............ 710/62
See application file for complete search history.

(56) References Cited

U.S. PATENT DOCUMENTS

| 5,841,987 | A | 11/1998 | Blatter et al. |
| 6,801,957 | B1 * | 10/2004 | Sadanaka et al. ............ 710/16 |
| 6,834,374 | B1 * | 12/2004 | Sameshima ................. 715/736 |
| 7,131,135 | B1 * | 10/2006 | Virag et al. .................. 725/80 |
| 2001/0052946 | A1 * | 12/2001 | Sato ............................. 348/706 |
| 2003/0071918 | A1 * | 4/2003 | Takano et al. ............... 348/552 |
| 2003/0195985 | A1 * | 10/2003 | Yokota ......................... 709/245 |

FOREIGN PATENT DOCUMENTS

| EP | 0975161 | 1/2000 |
| EP | 1045583 | 10/2000 |
| EP | 1176822 | 1/2002 |
| JP | 2001-268457 | 9/2001 |

OTHER PUBLICATIONS

Search Report Dated Aug. 20, 2003.

* cited by examiner

*Primary Examiner* — Alford W Kindred
*Assistant Examiner* — Brooke J Dews
(74) *Attorney, Agent, or Firm* — Robert D. Shedd; Joseph J. Opalach; Reitseng Lin

(57) ABSTRACT

A method and apparatus enables users to specify analog connections for devices on a data bus network such as an IEEE 1394 network in a convenient, time-efficient manner. According to an exemplary embodiment, the method includes steps of enabling an on-screen display comprising a list of devices connected to the digital data bus network requiring analog connections to the apparatus, and enabling a user to specify the analog connections responsive to the on-screen display.

16 Claims, 5 Drawing Sheets

METHOD AND APPARATUS FOR SPECIFYING ANALOG CONNECTIONS FOR DATA BUS NETWORK DEVICES HAVING BOTH DIGITAL AND ANALOG OUTPUTS

This application claims the benefit, under 35 U.S.C. §365 of International Application PCT/US03/12571, filed Apr. 22, 2003, which was published in accordance with PCT Article 21 (2) on Nov. 6, 2003 in English and which claims the benefit of United States Provisional Patent Application No. 60/375,136, filed Apr. 24, 2002 and United States Provisional Patent Application No. 60/375,207, filed Apr. 24, 2002.

BACKGROUND OF THE INVENTION

1. Field of the Invention

The present invention generally relates to a video signal processing apparatus and a method for controlling a video signal processing apparatus, and more particularly, to an apparatus and a method for enabling a user to efficiently and easily specify secondary analog connections for a plurality of peripheral devices connected to the apparatus via a digital data bus network connection and a plurality of analog inputs.

2. Related Art

A data bus can be utilized for interconnecting electronic devices, such as television signal receivers, personal computers, display devices, video cassette recorders (VCRs), digital versatile disk (DVD) players, direct broadcast satellite (DBS) receivers, home control devices (e.g., security systems, temperature control devices, etc.), and/or other devices. Communication using a data bus typically occurs in accordance with a specified bus protocol. An example of such a bus protocol includes the Institute for Electrical and Electronic Engineers 1394 High Performance Serial Bus protocol (IEEE 1394, or Firewire™), which is generally known in the art.

With a network, such as an IEEE 1394 network, a plurality of devices can be interconnected and the devices can exchange data, such as audio and/or video data, over the network. Moreover, a user may control one device on the network through inputs to another device on the network. Accordingly, a network such as an IEEE 1394 network provides interoperability among devices connected to the network. An IEEE 1394 bus can also accommodate a relatively large number of interconnected devices (e.g., up to 63), which may be connected in a daisy chain fashion.

Electronics Industries Association (EIA) 775 is a standard that describes how a source device sends data (e.g., on-screen display data, audio/video data, etc.) to a target device over an IEEE 1394 bus. In particular, EIA 775 acknowledges the fact that some source devices can send digital data, such as Motion Picture Expert Group (MPEG) video data, as well as analog data. For example, certain set-top boxes are capable of receiving and sending digital signals such as Advanced Television Standards Committee (ATSC) signals, as well as analog signals such as National Television Standards Committee (NTSC) signals. To accommodate such devices, EIA 775 specifies that a source device can inform a target device whether the signals it is sending to the target device are digital or analog. Accordingly, when the target device receives this information, its input source can be switched, for example, to an IEEE 1394 input connector if the signals are digital, or to one of its analog input connectors if the signals are analog.

With certain conventional devices, a user may interact with a potential target device to specify that a specific source device is connected to a given analog input terminal of the target device. For example, this interaction may occur when a new source device is connected to the target device, or in response to user selection of a set-up display in the target device. Unfortunately however, with such conventional devices this type of interaction is available only on a device-by-device basis. That is, conventional devices do not provide a single screen indicating all source devices connected to a target device and all of the possible analog inputs associated with the target device. Instead, a user may be required to navigate through multiple screens (e.g., one screen per source device) to specify the connections for a target device. This can be particularly inconvenient and time consuming for the user since he/she may have to navigate through many different screens to specify device connections. Moreover, the use of multiple screens to specify device connections can be problematic since the user must mentally keep track of the different source devices and connections on the target device as he/she navigates through the multiple screens.

Accordingly, there is a need for a method and apparatus which avoids the foregoing problems, and thereby enables users to specify analog connections for devices on a data bus network such as an IEEE 1394 network in a more convenient, time-efficient manner. The present invention addresses these and other issues.

SUMMARY OF THE INVENTION

In accordance with an aspect of the present invention, a method for controlling an apparatus connected to a digital data bus network is disclosed. According to an exemplary embodiment, the method comprises the steps of: coupling the apparatus to a plurality of peripheral devices, each of the plurality of peripheral devices having a digital output and an analog input, wherein the apparatus is coupled to the digital outputs of the plurality of peripheral devices via a digital data bus network connection, and the apparatus is coupled to each of the analog outputs of the plurality of peripheral device via a respective analog input of the apparatus; providing an on-screen display comprising a list of the plurality of peripheral devices connected to the apparatus and a list of the analog inputs of the apparatus; and associating a selected analog input to an analog output of a selected one of the plurality of peripheral device in response to user selections on the on-screen display.

In accordance with another aspect of the present invention, an electronic apparatus operative to perform the above-stated method is disclosed. According to an exemplary embodiment, the electronic apparatus comprises: input/output means comprising a digital data bus connection and a plurality of analog inputs for connecting the apparatus to a plurality peripheral devices, each of the plurality of peripheral devices having a digital output and an analog output, wherein the digital outputs of the plurality of peripheral devices is coupled to the apparatus via the digital data bus network connection, and the analog outputs of the plurality of peripheral device are coupled to the apparatus via a respective analog input of the apparatus; means for receiving user input; means for generating an on-screen display; means, coupled to the digital data bus connection and the plurality of analog inputs, for processing received video signals and providing output signals suitable for display; and means for coupling the output signals to a display device, wherein the generating means provides an on-screen display including a list of the plurality of peripheral devices coupled to the apparatus and a list of the analog inputs of the apparatus, and the processing means associates a selected analog input to an analog output of a selected one of the plurality of peripheral device in response to user selections on the on-screen display.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
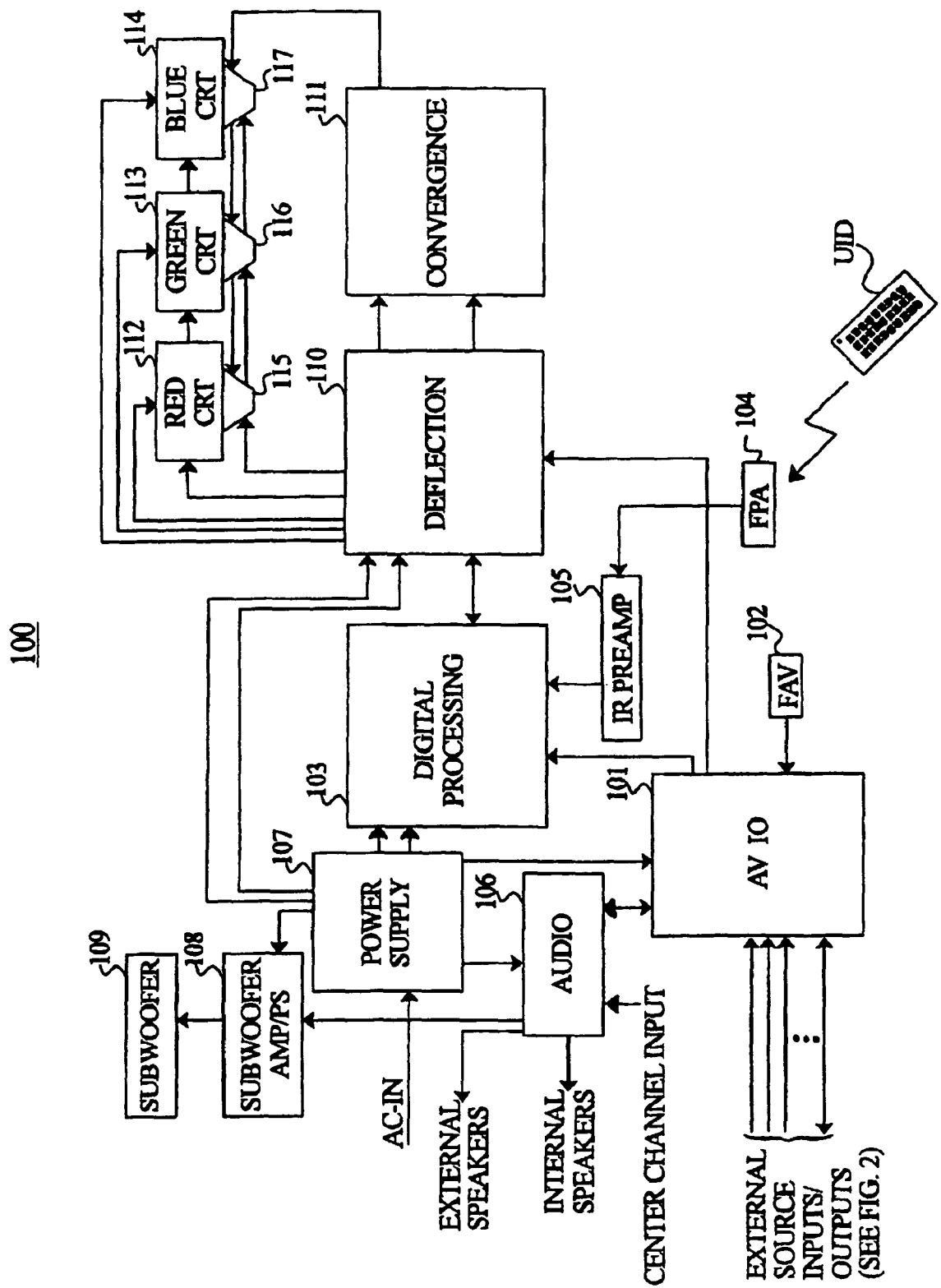
FIG. 1 is an exemplary apparatus suitable for implementing the present invention.

Referring now to the drawings, and more particularly to FIG. 1, an exemplary apparatus 100 suitable for implementing the present invention is shown. For purposes of example and explanation, apparatus 100 represents an exemplary portion of a television signal receiver embodied as a projection screen television. However, it will be intuitive to those skilled in the art that principles of the present invention may be applied to other apparatuses designed to perform the functions described below.

As shown in FIG. 1, apparatus 100 comprises an audio/video input/output (AV IO) block 101, a front audio/video (FAV) connector 102, a digital processing block 103, a front panel assembly (FPA) 104, an infrared (IR) preamp 105, an audio block 106, a power supply 107, a subwoofer amp/power supply 108, a subwoofer 109, a deflection block 110, a convergence block 111, CRTs 112 to 114, and yokes 115 to 117. The foregoing elements of FIG. 1 are operatively coupled as indicated by the data lines shown in FIG. 1. As will be intuitive to those skilled in the art, many of the elements, or combinations of elements, represented in FIG. 1 may be embodied using integrated circuits (ICs).

AV IO block 101 comprises various input terminals, including, but not limited to, S-video inputs, RF inputs, component inputs, and IEEE 1394 input, and is operative to receive and process audio, video, control and/or other inputs, and to output processed signals to other elements of apparatus 100, as indicated in FIG. 1. According to an exemplary embodiment, AV IO block 101 receives audio, video, and/or control inputs from a plurality of external sources such as, but not limited to, the devices represented in FIG. 2.

Figure 2:
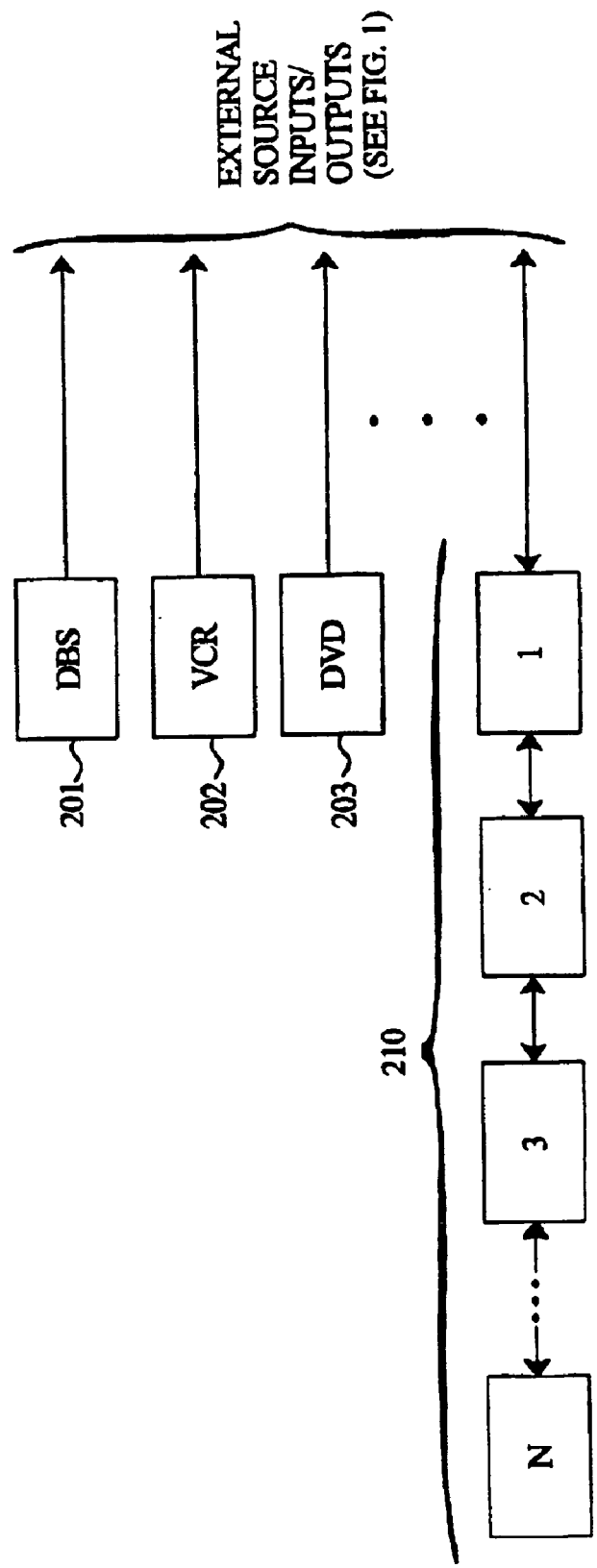
FIG. 2 is a diagram illustrating an exemplary connection of devices to the apparatus of FIG. 1.

As indicated in FIGS. 1 and 2, AV IO block 101 receives audio, video and/or other inputs from external devices 201 to 203, which for purposes of example are represented in FIG. 2 as a DBS receiver, a VCR, and a DVD player, respectively. Accordingly, devices 201 to 203 are source devices for apparatus 100. Other external devices may be connected to AV IO block 101, and the number of such devices may for example depend on the number of input terminals provided by AV IO block 101.

AV IO block 101 is operatively coupled to at least one bi-directional digital data bus network 210 (see FIG. 2), such as an IEEE 1394 bus network, or the like. As indicated in FIG. 2, data bus network 210 includes up to N interconnected devices (e.g., television signal receivers, personal computers, display devices, VCRs, DVD players, DBS receivers, and/or other devices), which are capable of communicating with one another in a known manner, such as in accordance with the IEEE 1394 bus protocol. According to an exemplary embodiment, N is equal to sixty-three (63). Apparatus 100 may exchange audio, video, control, and/or other signals with any of the devices on data bus network 210 via AV IO block 101. Data bus network 210 may be arranged in a variety of different configurations such as, but not limited to, the exemplary configuration shown in FIG. 2, and/or other configurations.

AV IO block 101 also receives processed audio inputs from audio block 106.

According to an exemplary embodiment, AV IO block 101 processes inputs and outputs composite video signals and all audio signals to digital processing block 103 for additional processing, while outputting component video signals (e.g., 2H, 2.14H, Y, Pr, Pb video information) to deflection block 110. FAV connector 102 is operative to provide audio and/or video inputs to AV IO block 101.

Digital processing block 103 is operative to perform various digital functions of apparatus 100, such as tuning, demodulation, signal decompression, memory and other functions. Digital processing block 103 outputs processed video signals to deflection block 110 which enable a visual display. As will be explained later herein, digital processing block 103 also enables, among other things, a user to specify secondary analog connections for devices connected on data bus network 210.

FPA 104 is an interface operative to receive user inputs from a user input device (UID), such as an IR hand-held remote control, keyboard, or other input device, and to output signals corresponding to the user inputs to IR preamp 105. IR preamp 105 is operative to amplify the signals provided from FPA 104 for output to digital processing block 103.

Audio block 106 is operative to perform various audio processing functions, to and to output processed audio signals. According to an exemplary embodiment, audio block 106 receives a center channel input signal and processes the same to generate audio output signals. As indicated in FIG. 1, audio block 106 is operative to provide audio output signals to both external and internal speakers of apparatus 100.

Additionally, audio block 106 provides audio output signals to AV IO block 101, and also provides subwoofer audio signals to subwoofer amp/power supply 108.

Power supply 107 is operative to receive an input alternating current power signal (AC-IN), and to output voltage signals which power the various elements of apparatus 100, as indicated in FIG. 1. According to an exemplary embodiment, power supply 107 provides such voltage signals to AV IO block 101, digital processing block 103, audio block 106, subwoofer amp/power supply 108, and deflection block 110. Subwoofer amp/power supply 108 is operative to amplify the subwoofer audio signals provided from audio block 106, and provide the amplified subwoofer audio signals to subwoofer 109. Subwoofer amp/power supply 108 also outputs a voltage signal to subwoofer 109, which serves as its power supply. Subwoofer 109 is operative to aurally output the amplified subwoofer audio signals provided from subwoofer amp/power supply 108.

Deflection block 110 is operative to control deflection functions of apparatus 100. According to an exemplary embodiment, deflection block 110 outputs deflection control signals to yokes 115 to 117, which control horizontal and vertical deflection of the high-intensity beams generated by CRTs 112 to 114, respectively. Deflection block 110 is also operative to output color control signals to CRTs 112 to 114 responsive to the processed video signals and other control signals provided from digital processing block 103. Also according to an exemplary embodiment, deflection block 110 is operative to output voltage signals to convergence block 111 and CRTs 112 to 114 for their power supplies.

Convergence block 111 is operative to control convergence functions of apparatus 100. According to an exemplary embodiment, convergence block 111 outputs convergence control signals to yokes 115 to 117, as indicated in FIG. 1, which control a positive convergence adjustment for precisely focusing the high-intensity beams emitted from CRTs 112 to 114 on a screen (not shown).

CRTs 112 to 114 are operative to generate high-intensity red, green and blue beams, respectively, for display on a screen responsive to the color control signals from deflection block 110. Yokes 115 to 117 are operative to control CRTs 112 to 114, respectively, responsive to the deflection control signals from deflection block 110 and the convergence control signals from convergence block 111. Other suitable display devices, including, but not limited to, LCDs, plasma displays, OLEDs, and DLP displays may be used.

Figure 3:
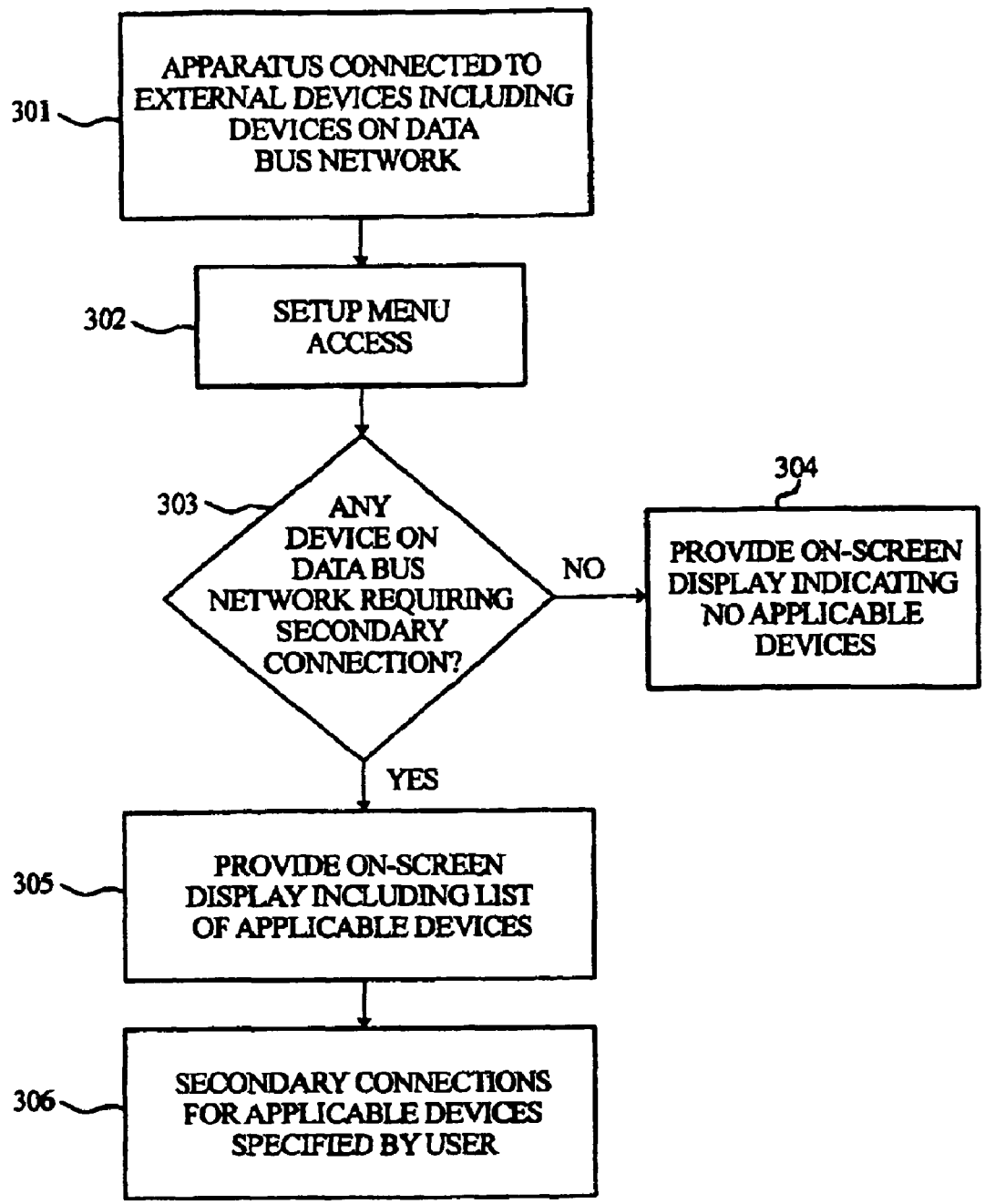
FIG. 3 is a flowchart illustrating exemplary steps according to the present invention.

Turning now to FIG. 3, a flowchart 300 illustrating exemplary steps according to one aspect of the present invention is shown. For purposes of example and explanation, the steps of FIG. 3 will be described with reference to apparatus 100 of FIG. 1 and the exemplary external devices of FIG. 2. The steps of FIG. 3 are merely exemplary, and are not intended to limit the present invention in any manner.

At step 301, apparatus 100 is connected to external devices including devices on data bus network 210. According to an exemplary embodiment, a user physically connects devices 201 to 203 of FIG. 2 to input terminals of AV IO block 101 in a conventional manner, and thereby enables devices 201 to 203 to operate as source devices to apparatus 100 by providing audio and/or video input signals thereto. Also at step 301, the user constructs data bus network 210 of FIG. 2 by physically connecting devices 1 to N in a desired configuration, and connecting one of the devices on data bus network 210 to an input/output terminal (e.g., IEEE 1394 terminal) of AV IO block 101. According to an exemplary embodiment, apparatus 100 may represent a target device and the devices 1 to N on data bus network 210 may represent source devices. As previously indicated herein, data bus network 210 may be arranged in a variety of different configurations such as, but not limited to, the exemplary configuration shown in FIG. 2, and/or other configurations.

According to an exemplary embodiment, apparatus 100 detects each device as it is connected to data bus network 210 including its need for a secondary analog connection at step 301. The operation of the bus network in recognizing and adding new devices to, or removing devices from, the network is well known. Generally, upon connection to the network, the network undergoes a configuration process, wherein each device on the network 210 provides identification data and control data, including manufacturer name, model name, identifiers including the GUID and EUID, and the various outputs and capabilities of the device, as necessary for configuring the network. Such data is generally stored in a configuration ROM of each device. Such data also indicates whether that particular device requires a secondary analog connection to apparatus 100. Apparatus 100, or a designated device on the network, stores this data (e.g., in memory of digital processing block 103) and updates it accordingly as devices are connected to and/or disconnected from data bus network 210. In this manner, apparatus 100 keeps track of all devices connected to it on data bus network 210 at any given time, including their requirements for a secondary analog connection. At this point the user may connect the analog outputs of the peripheral devices to any of the available analog inputs of apparatus 100.

After apparatus 100 is connected to the external devices at step 301, process flow advances to step 302 where a user may access a setup menu of apparatus 100 that enables the user to specify secondary analog connections for all of the devices on data bus network 210 requiring such a connection. According to an exemplary embodiment, the user may access this setup menu by providing inputs to apparatus 100 via the UID which enable him/her to select from among various on-screen menus provided by apparatus 100. Such menus may for example be stored in memory of digital processing block 103. Digital processing block 103 responds to the user inputs by enabling generation of the various on-screen menus, which are displayed via CRTs 112 to 114.

At step 303, a determination is made as to whether any of the devices on data bus network 210 require a secondary analog connection to apparatus 100. According to an exemplary embodiment, digital processing block 103 makes this determination based on the data received from the devices on data bus network 210 at step 301, including any data later received responsive to the addition and/or removal of devices from data bus network 210.

Figure 4:
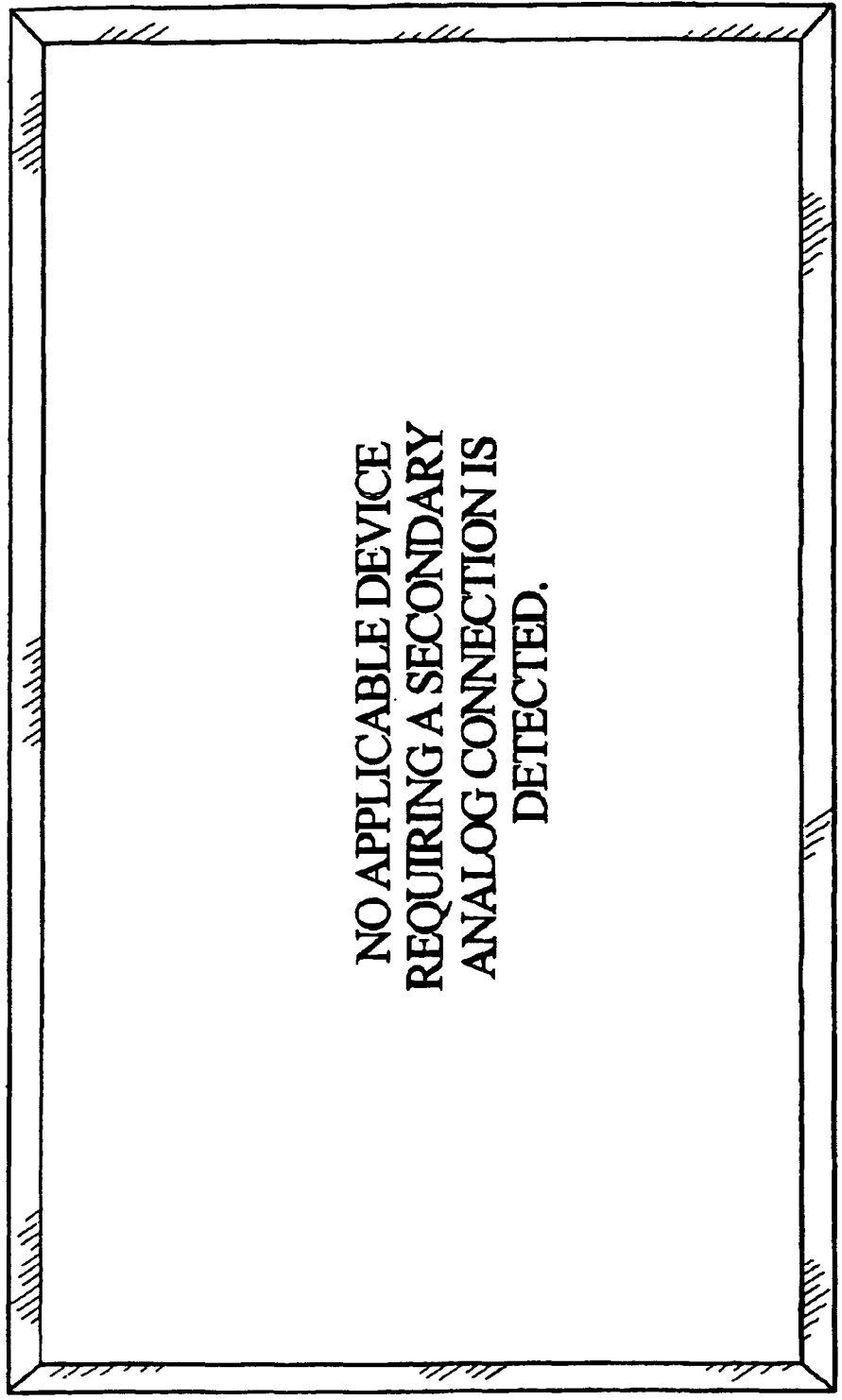
FIG. 4 is an exemplary on-screen display according to the present invention.

If the determination at step 303 is negative, process flow advances to step 304 where an on-screen display is provided to indicate that apparatus 100 does not detect any devices on data bus network 210 that require a secondary analog connection. FIG. 4 shows an exemplary on-screen display 400 suitable for use at step 304. Of course, on-screen display 400 is only an example, and other items such as context sensitive help information, and/or other items may also be provided and/or other formats used in on-screen display 400 according to the present invention. According to an exemplary embodiment, the on-screen display of step 304 may be stored in memory of digital processing block 103 and displayed via CRTs 112 to 114 under the control of digital processing block 103.

Figure 5:
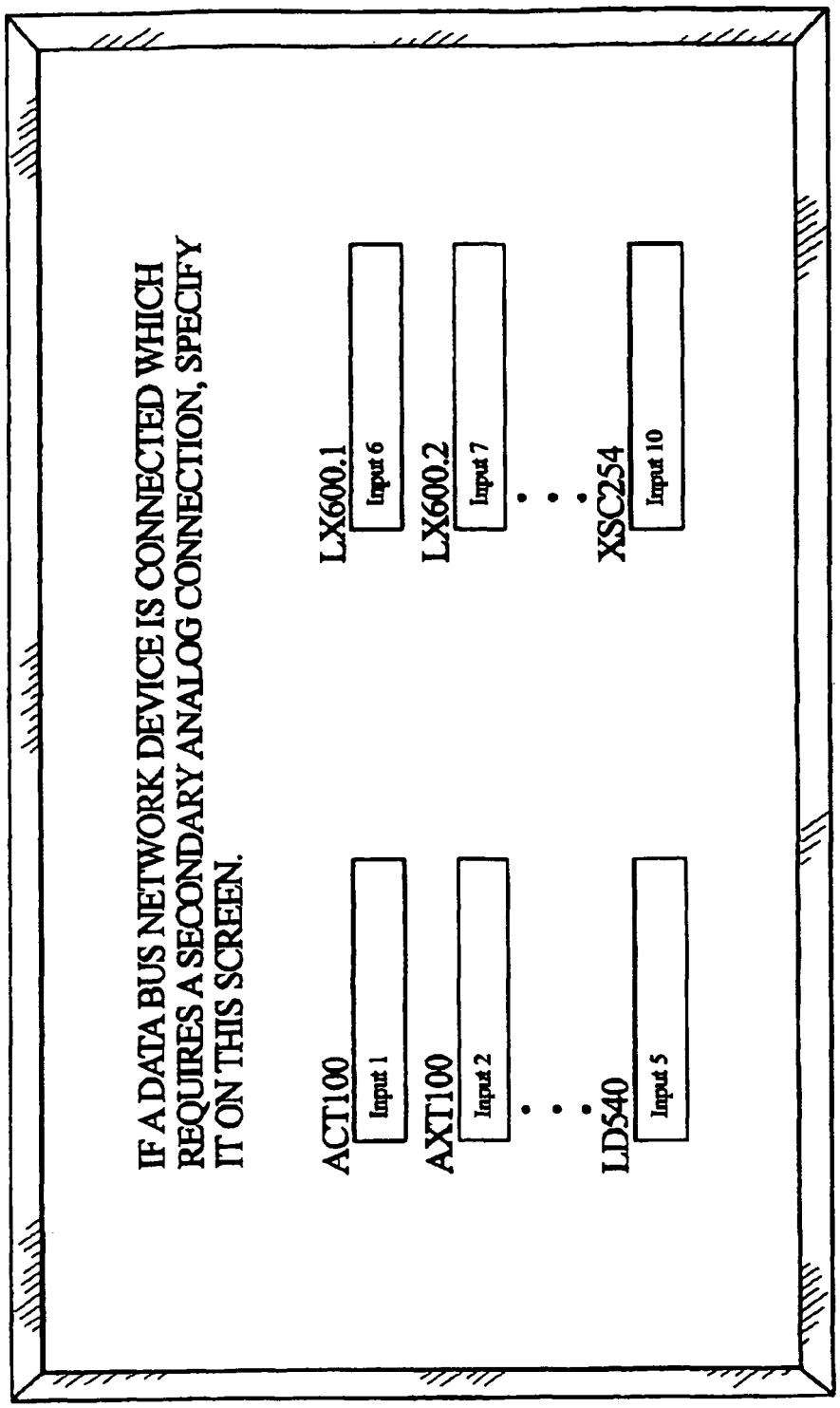
FIG. 5 is another exemplary on-screen display according to the present invention.

Alternatively, if the determination at step 303 is positive, process flow advances to step 305 where an on-screen display is provided including a list of all devices on data bus network 210 requiring a secondary analog connection to apparatus 100. FIG. 5 shows an exemplary on-screen display 500 including such a list. On-screen display 500 is also only an example, and other items such as context sensitive help information, and/or other items may also be provided and/or other formats used in on-screen display 500 according to the present invention. According to an exemplary embodiment, the on-screen display of step 305 may be stored in memory of digital processing block 103 and displayed via CRTs 112 to 114 under the control of digital processing block 103. The on-screen display of step 305 may also be provided whenever a source device is connected to data bus network 210.

According to the present invention, the list of devices displayed at step 305 may be arranged in various different ways to facilitate ease of selecting the devices and associated analog input. Moreover, different target devices may differ from one another in the way they present the list of devices. In on-screen display 500 of FIG. 5 for example, the displayed list of devices is arranged alphabetically by model name. The model names may be abbreviated to conserve screen space. Also in exemplary on-screen display 500 of FIG. 5, the displayed list of devices includes at least two identical devices, that is, device having the same manufacturer and model name (i.e., model LX600). The present invention automatically recognizes the occurrence of such identical device models and distinguishes between them by appending predetermined designators, such as a numerical suffix and/or other designation, to the model name, or designations, on display 500. In FIG. 5 for example, the identical models include numerical suffixes (i.e., LX600.1 and LX600.2). Additional devices of the same model can likewise be identified (e.g., LX600.3, LX600.4, and so on). In this manner, a user can readily distinguish among multiple devices of the same model in the display list at step 305.

When a character designation, such as a numerical suffix, is used to distinguish among identical models in the display list at step 305, it may be desirable to allow users to specify how the character designations are assigned. For example, a user may be allowed to designate which device includes the "0.1," designation, which device includes the "0.2" designation, and so on. The designations may be permanently maintained by keeping a table associating the designations including the suffix, with the unique identifier, such as the EUID, associated with the device, such that the identifier is automatically maintained when the device is added back to the network. This flexibility may be advantageous when, for example, devices are frequently added to and/or removed from data bus network 210. Alternatively, with other designs, it may not be desirable to allow users to specify how the character designations are assigned. Such character designations may also be assigned automatically by apparatus 100. All of these alternatives are within the scope of the present invention.

According to another exemplary embodiment, the list of devices displayed at step 305 may be arranged alphabetically by manufacturer name, and such names may be abbreviated to conserve screen space. According to yet another exemplary embodiment, the list of devices displayed at step 305 may be arranged based on digital identification codes associated with the devices. For example, each IEEE 1394 device includes a unique sixty-four (64) bit identification code (EUID). Accordingly, the list of devices displayed at step 305 may for example be arranged based on the values represented by such identification codes (e.g., from lowest value to highest value, etc.) regardless of whether such codes are actually displayed. Arranging the list of devices based on such identification codes can be useful since it may allow consistency in the order in which devices are displayed and tuned. Additionally, arranging the list of devices based on such identification codes may be useful when one or more devices have no manufacturer or device name.

According to still yet another exemplary embodiment, the list of devices displayed at step 305 may be arranged based on a combination of device characteristics such as, but not limited to, the ones previously described herein (i.e., model name, manufacturer name, digital identification code). For example, the list of devices displayed at step 305 may be arranged alphabetically by manufacturer name followed by device name. As another example, the list of devices displayed at step 305 may be arranged based on device identification codes, but the devices may be identified in the display list according to another characteristic, such as model name. Other combinations may also be used according to the present invention. Moreover, users may be provided the option of selecting their own device names.

At step 306, the secondary analog connections for the network devices listed at step 305 may be specified by the user. According to an exemplary embodiment, the user specifies these connections by providing inputs to apparatus 100 via the UID responsive to the on-screen display list provided at step 305. Data corresponding to the specified connections is then stored in memory (e.g., in block 103) under the control of digital processing block 103, thereby enabling the user's specified device connections to be used in the operation of apparatus 100 when necessary. For example, in FIG. 5 the user has selected input 1 for model ACT100, input 2 for model AXT100, input 5 for model LD500, input 6 for the first model LX600, input 7 for the second model LX600, and input 10 for model XSC254. The number of connections specified by the user at step 306 is of course influenced by the number of input connections available on apparatus 100, which is a matter of design choice.

As described herein, the present invention provides a method and apparatus, which enables users to specify analog connections for devices on a data bus network such as an IEEE 1394 network in a convenient, time-efficient manner. The present invention is applicable to various electronic apparatuses that perform the various signal processing functions described hereinabove. Accordingly, the phrase "television signal receiver" as used herein may refer to devices or apparatuses including, but not limited to, television sets, computers, monitors, set-top boxes, VCRs, DVD players, stereos, video game boxes, personal video recorders (PVRs), and/or other apparatuses. Further, although an exemplary embodiment has been described, it is clear to those skilled in the art that the functions described above can be implemented using various elements, or combination of elements, including microprocessors, memory elements, device control elements, and software elements as required.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for controlling a video signal processing apparatus, comprising the steps of:

coupling the video signal processing apparatus to digital connections of a plurality of peripheral devices via a digital data bus;

receiving digital data from each of the plurality of peripheral devices via the digital data bus, the digital data indicating whether each of the plurality of peripheral devices includes an analog connection capable of being physically made, but not yet physically made, to the video signal processing apparatus;

determining from the received digital data if any of the plurality of peripheral devices includes an analog connection capable of being physically made, but not yet physically made, to the video signal processing apparatus;

if none of the plurality of peripheral devices includes an analog connection capable of being physically made, but not yet physically made, to the video signal processing apparatus, providing a first on-screen display indicating that none of the plurality of peripheral devices includes an analog connection capable of being physically made, but not yet physically made, to the video signal processing apparatus;

if at least one of the plurality of peripheral devices includes an analog connection capable of being physically made, but not yet physically made, to the video signal processing apparatus, providing a second on-screen display having a list expressly reciting the at least one of the plurality of peripheral devices that includes an analog connection capable of being physically made, but not yet physically made, to the video signal processing apparatus;

and associating a selected analog connection of the video signal processing apparatus with a selected one of the at least one of the plurality of peripheral devices in response to a user selection from the list; wherein the list included in the second on-screen display is arranged based on digital identification codes associated with the at least one of the plurality of peripheral devices.

2. The method according to claim 1, further comprising the step of receiving identification information from each of the plurality of peripheral devices during a set up mode of the digital data bus, wherein the second on-screen display includes the identification information.

3. The method according to claim 2, wherein the coupling step includes coupling the video signal processing apparatus to at least one set of identical peripheral devices, and further comprising the step of appending predetermined designators to the identification information associated with the at least one set of identical peripheral devices to distinguish the identical peripheral devices on the digital data bus.

4. The method according to claim 3, wherein the digital data bus comprises an IEEE 1394 bus.

5. The method according to claim 1, wherein the list included in the second on-screen display is arranged alphabetically by model name.

6. The method according to claim 1, wherein the list included in the second on-screen display is arranged alphabetically by manufacturer name.

7. A video signal processing apparatus, comprising:
input/output means comprising a digital data bus connection and a plurality of analog connections, wherein the digital data bus connection is connected to digital connections of a plurality of peripheral devices via a digital data bus and receives digital data from each of the plurality of peripheral devices via the digital data bus, the received digital data indicating whether each of the plurality of peripheral devices includes an analog connection capable of being physically made, but not yet physically made, to the video signal processing apparatus;
processing means for processing the received digital data to determine if any of the plurality of peripheral devices includes an analog connection capable of being physically made, but not yet physically made, to the video signal processing apparatus;
wherein if none of the plurality of peripheral devices includes an analog connection capable of being physically made, but not yet physically made, to the video signal processing apparatus, the processing means enables a first on-screen display indicating that none of the plurality of peripheral devices includes an analog connection capable of being physically made, but not yet physically made, to the video signal processing apparatus;
and wherein if at least one of the plurality of peripheral devices includes an analog connection capable of being physically made, but not yet physically made, to the video signal processing apparatus, the processing means enables a second on-screen display having a list expressly reciting the at least one of the plurality of peripheral devices that includes an analog connection capable of being physically made, but not yet physically made, to the video signal processing apparatus, and further enables a user to associate a selected one of the analog connections of the video signal processing apparatus with a selected one of the at least one of the plurality of peripheral devices in response to a selection from the list. wherein the list included in the second on-screen display is arranged based on digital identification codes associated with the at least one of the plurality of peripheral devices.

8. The video signal processing apparatus according to claim 7, wherein the processing means receives identification information from each of the plurality of peripheral devices during a set up mode of the digital data bus, and the second on-screen display includes the identification information.

9. The video signal processing apparatus according to claim 8, wherein the processing means, upon determining that the plurality of peripheral devices includes at least one set of identical peripheral devices, automatically appends predetermined designators to the identification information associated with the at least one set of identical peripheral devices to distinguish the identical peripheral devices on the digital data bus, and the predetermined designators are included in the second on-screen display.

10. The video signal processing apparatus according to claim 9, wherein the digital data bus is an IEEE 1394 bus.

11. The video signal processing apparatus according to claim 7, wherein the list included in the second on-screen display is arranged alphabetically by model name.

12. The video signal processing apparatus according to claim 8, wherein the list included in the second on-screen display is arranged alphabetically by manufacturer name.

13. A television signal receiver, comprising:
input/output means comprising a digital data bus connection and a plurality of analog connections, wherein the digital data bus connection is connected to digital connections of a plurality of peripheral devices via a digital data bus and receives digital data from each of the plurality of peripheral devices via the digital data bus, the received digital data indicating whether each of the plurality of peripheral devices includes an analog connection capable of being physically made, but not yet physically made, to the television signal receiver;
processing means for processing the received digital data to determine if any of the plurality of peripheral devices includes an analog connection capable of being physically made, but not yet physically made, to the television signal receiver;
wherein if none of the plurality of peripheral devices includes an analog connection capable of being physically made, but not yet physically made, to the television signal receiver, the processing means enables a first on-screen display indicating that none of the plurality of peripheral devices includes an analog connection capable of being physically made, but not yet physically made, to the television signal receiver;
and wherein if at least one of the plurality of peripheral devices includes an analog connection capable of being physically made, but not yet physically made, to the television signal receiver, the processing means enables a second on-screen display having a list expressly reciting the at least one of the plurality of peripheral devices that includes an analog connection capable of being physically made, but not yet physically made, to the television signal receiver, and further enables a user to associate a selected one of the analog connections of the television signal receiver with a selected one of the at least one of the plurality of peripheral devices in response to a selection from the list; wherein the list included in the second on-screen display is arranged based on digital identification codes associated with the at least one of the plurality of peripheral devices.

14. The television signal receiver according to claim 13, wherein the processing means receives identification information from each of the plurality of peripheral devices during a set up mode of the digital data bus, and the second on-screen display includes the identification information.

15. The television signal receiver according to claim 13, wherein the processing means, upon determining that the plurality of peripheral devices includes at least one set of identical peripheral devices, automatically appends predetermined designators to the identification information associated with the at least one set of identical peripheral devices to distinguish the identical peripheral devices on the digital data bus, and the predetermined designators are included in the second on-screen display.

16. The television signal receiver according to claim 13, wherein the digital data bus is an IEEE 1394 bus.

* * * * *